INVENTORS
LUDWIG J. CHRISTMAN,
BY GEORGE H. FOSTER,
Ellis S. Middleton ATTORNEY.

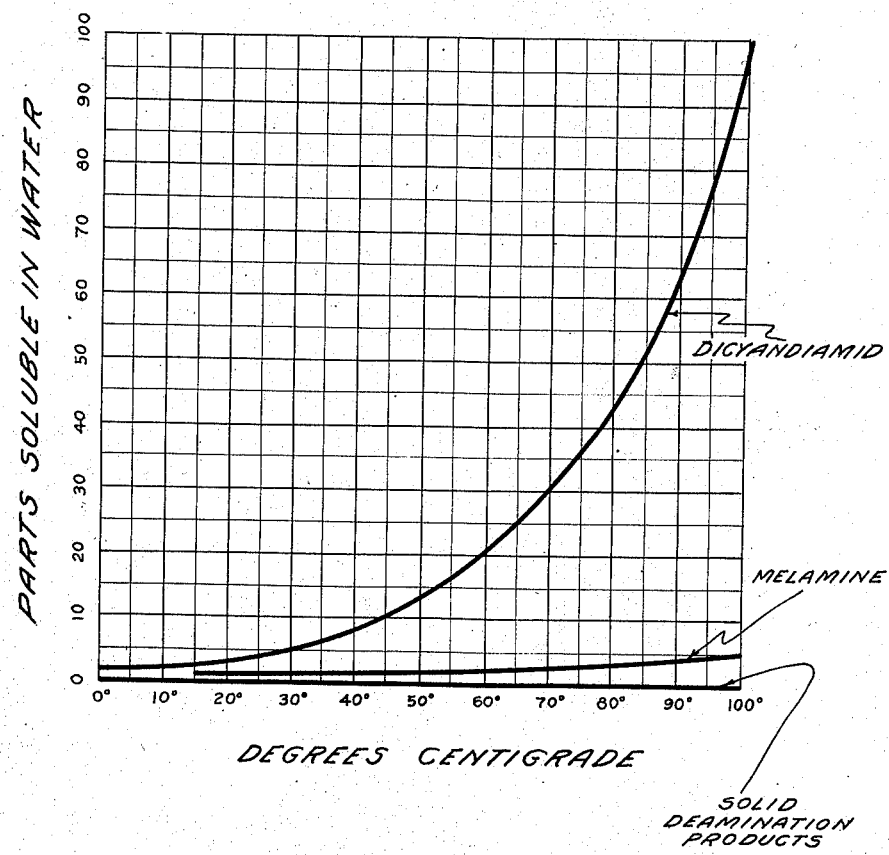

Patented June 11, 1940

2,203,860

UNITED STATES PATENT OFFICE 2,203,860

MANUFACTURE OF MELAMINE AND ITS DEAMINATION PRODUCTS

Ludwig J. Christmann, Bronxville, and George H. Foster, Stamford, Conn., assignors to American Cyanamid Company, New York, N. Y., a corporation of Maine Application December 17, 1938, Serial No. 246,254

10 Claims. (Cl. 260—248)

The present invention relates to a process for the manufacture of melamine and/or its solid deamination products, namely melam, melem and mellon, in which recovery emphasis may be placed upon any or all thereof.

It is well known that when free cyanamid is heated to a temperature in the neighborhood of 150° C. or by dry fusion of dicyandiamid at higher temperatures, melamine and its deamination products may be formed. However, due to the strongly exothermic nature of the reaction and/or the molecular rearrangement, it has been extremely difficult to control the temperature in the conversion apparatus. If adequate control is not obtained, undue amounts of the deamination products are formed and a considerable quantity of the otherwise desired substances are converted to ammonia.

Previous attempts have been made to control this reaction temperature by utilizing substances susceptible of functioning as heat buffers. Where these materials are liquid, they have been such that they were difficult to handle and presented a problem in the separation thereof from the melamine and/or its deamination products. Where such heat buffers were solids, they have universally taken the form of fine powders, the individual particles of which were not appreciably larger than the particles of cyanamid or dicyandiamid used as the starting materials. As a consequence, where a conversion heat was used greater than the fusion temperature of the starting material, a pasty, sticky mass resulted which not only gave extreme difficulties by reason of coating the walls of the conversion furnace but heat distribution to the mass and exothermic heat abstraction from the mass proceeded irregularly, with consequent loss of efficiency.

It is a principal object of the present invention to devise a heat conversion method particularly applicable to the treatment of dicyandiamid which will avoid the above difficulties, while at the same time using a heat buffer having a large capacity for exothermic heat abstraction and which will be present in quantity both as to volume and weight sufficient for the purpose.

Another important object of the invention is the provision of a heat buffer in such form that the starting material may be distributed thereover in small masses or thin films which thereby not only increases the area thereof exposed to the reaction heat but prevents the formation of unduly large sticky masses either of starting material or furnace products.

Another important object of the invention resides in the treatment of the furnace product produced as above, taking advantage of the relative solubilities of dicyandiamid, melamine and its deamination products, whereby a more or less clean separation therebetween may be had and recovery of the desired product in a state of purity.

To this end, the invention contemplates in one of its broadest aspects the furnacing of dicyandiamid to a melamine-forming temperature in the presence of a heat buffer which will simultaneously act as a comminuting agent and be capable of distributing the fused starting material over the surface thereof in a thin film. It will also be apparent that, as a consequence of this circumstance, the comminuting agent will also have a large capacity for heat absorption, thus giving adequate control of the furnace temperature. Such heat buffers are preferably in the form of solid masses of appreciable size, such for instance as balls of steel, iron, bronze, quartz, porcelain or the like, not less than a quarter inch in diameter and in quantity more than twice the weight of that of the dicyandiamid being treated at the time.

The invention further contemplates separation of the unconverted dicyandiamid, melamine and/or its deamination products by taking advantage of their relative solubilities in water, although separation may be thus obtained by the use of other solvents.

The invention further consists of the novel steps and combination of steps more fully hereinafter described and shown in the accompanying drawings.

In the drawings—

Fig. 2 is a graph showing the relative solubilities of dicy, melamine and its deamination products in water.

Figure 1:
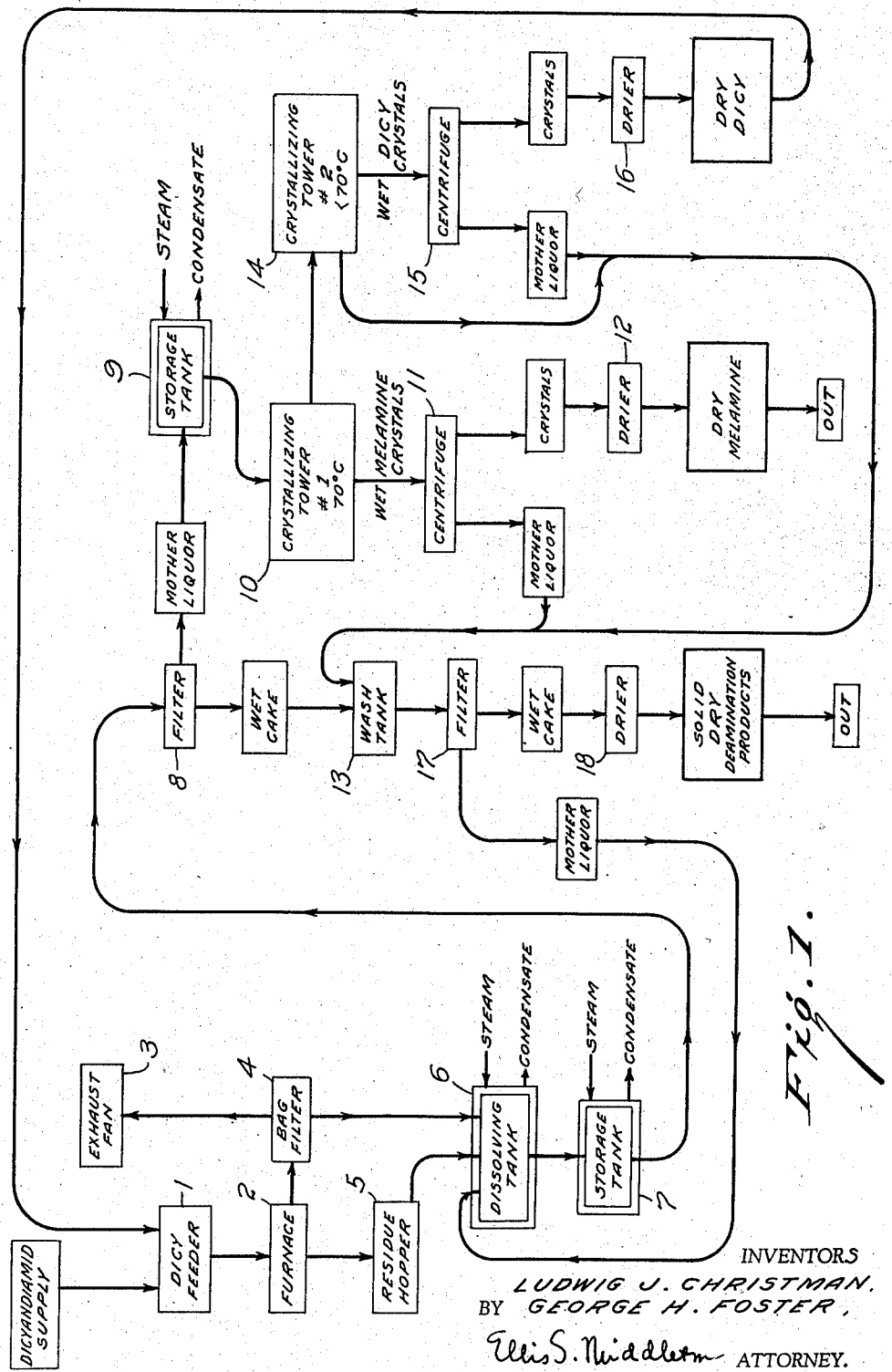
Fig. 1 is a diagrammatic flow sheet of a preferred method of carrying out the invention.

Referring now to Fig. 1, a supply of dicyandiamid may pass from feeder 1 into a conversion furnace 2 which may conveniently take the form of a rotating ball mill. This furnace may be maintained at a temperature of from 225 to 350° C., although a temperature in the neighborhood of 300° C. is found to be most suitable. Means for supplying heat to the furnace may conveniently take the form of a burner, positioned to heat the exterior thereof or, on the other hand, the hot combustion products may be discharged directly into a furnace and thus assist in conveying heat to the material undergoing treatment.

As above mentioned, the heat abstracting medium in such a furnace may preferably take the form of steel balls not less than a quarter inch in diameter where the weight of such balls is more than twice that of the dicyandiamid in the furnace at any time.

As the temperature reaches the melting point of the dicyandiamid, it fuses and coats the balls with a thin film thereof. Due to the fact that the volume of each ball is so much greater than the total volume of film of dicyandiamid on its surface, it is a simple matter to thus control the furnace temperature through abstraction of exothermic reaction heat. As the balls tumble upon themselves, they have a tendency to comminute the dicyandiamid being fed into the furnace and thus prevent the formation of any lumps or agglomerated crystals, all of which tends to promote a more complete reaction. As heat products are formed, they are likewise maintained in a state of sub-division in the same manner. Consequently, not only are the furnace walls maintained free from accumulation of starting and reaction materials but there is a free discharge flow of such furnace products due to the pulverizing or comminuting action of the heat abstracting medium.

Where desired, a stream of air or other inert gas may be drawn through the conversion furnace 2 by the fan 3 to assist in removing fume and gaseous decomposition products such as ammonia, although where the source of heat is a burner discharging into the furnace, this movement of gas may be sufficient for the purpose. A bag filter or the like 4 is provided to receive the gas and fume from the furnace while the gaseous products thereof pass outwardly therefrom. Inasmuch as these gaseous products may contain appreciable quantities of ammonia, they may be utilized for any desired purpose. It has been found that the contents of the bag filter may run as high as 80% melamine, the remaining portion being principally unconverted dicyandiamid and deamination products.

The remaining materials in the conversion furnace, and containing from 35 to 40% melamine, are then fed into a residue hopper 5 and, together with the contents of the bag filter 4, discharged into a dissolving tank 6 which contains water at approximately 100° C. This tank may be suitably provided with steam coils or other heating media in order to maintain the temperature at the desired point.

In the tank, the dicyandiamid and melamine are dissolved while the deamination products remain as a residue. The entire product from the dissolving tank 6 is then passed to a storage tank 7. Both the dissolving and storage tanks may be equipped with suitable stirring or agitation devices where desired.

The water solution of dicyandiamid and melamine, together with suspended deamination products are then passed to a filter or other separation device 8, the filtrate from which containing the melamine and unconverted dicyandiamid passes into a storage tank 9, equipped with heating means so as to maintain the contents at approximately 100° C.

In order to separate the dissolved melamine from the dicyandiamid, advantage is taken of their relative solubilities in water as shown in the graph in Fig. 2. It is to be noted that at approximately 70° C. the solubility of dicyandiamid is such that it will remain in solution while substantial quantities of melamine may be precipitated. Consequently, the solution from the storage tank 9 is then passed to a first crystallizing tower 10 in which the temperature is lowered to approximately 70° C. by any suitable means. In this tower, due to the relative insolubility of melamine in water at this temperature as shown in Fig. 2, a large portion of the melamine crystallizes out. These crystals are separated from the liquor going to the second crystallizing tower and the wet crystals, with their adherent mother liquor, then pass to a centrifuge or the like 11. The melamine cake is then treated with fresh water at substantially 70° C. and the thus washed crystals removed to drier 12, where the remaining water is evaporated. A product of approximately 90% purity may thus be obtained as a result of this crystallizing step. Further crystallization of the product from water to remove remaining small portions of unconverted dicyandiamid may be carried out where desired.

The small quantity of adherent mother liquor separated from the melamine crystals in the centrifuge 11 passes back together with the wash water therefrom into a wash tank 13 which also receives the cake from the filter 8. This cake contains all of the deamination products inasmuch as it will be noted from the graph that they are substantially insoluble in water.

The solution from the crystallizing tower 10, still containing appreciable quantities of melamine and substantially all of the unconverted dicyandiamid, is then passed to a second crystallizing tower 14 in which the temperature is lowered by any suitable means to such a point that most of the dicyandiamid will crystallize out. In order to accomplish this result, a temperature lower than 70° C., that is, substantially 30° C., should be used. Fig. 2 shows this to be a desirable temperature. The dicyandiamid thus crystallized and containing only small portions of adhering mother liquor containing melamine, is then separated therefrom as by centrifuge 15, the dicyandiamid crystals then going to drier 16 where residual moisture is removed, the substantially dry crystals then returning to the cycle by introduction into the feeder 1.

The mother liquor from the second crystallizing tower 14 and the centrifuge 15 still containing some melamine and dicyandiamid is returned to the wash tank 13 for the recovery of such values.

In the tank 13, the cake from filter 8 consisting essentially of the substantially water insoluble deamination products and residual quantities of dicyandiamid and melamine, is agitated with water maintained at substantially 100° C. This has the effect of dissolving substantially all of the contained melamine and dicyandiamid so that when the entire contents of this tank is passed to a filter or other separation device 17, the cake consists of the solid deamination products in a good state of purity, which may be dried in an oven 18 and disposed of as desired. The mother liquor from the filter 17 passes back to the dissolving tank 6 for recycling.

Example I

| | | |
|---|---|---|
| Temperature of conversion furnace | 260° C. ±10° | |
| Charged | 5200 | parts dicyandiamid |
| Recovered in bag filter | 710 | parts containing |
| | 70 | parts dicyandiamid |
| | 538 | parts melamine |
| | 102 | parts deamination products |
| Recovered in residue hopper | 4290 | parts containing |
| | 124 | parts dicyandiamid |
| | 1712 | parts melamine |
| | 2454 | parts deamination products |

Substantially complete separation and recovery of these products were then made by crystallization from water, the dicyandiamid being returned to the cycle.

Example II

| | | |
|---|---|---|
| Temperature of conversion furnace | 320° C. ±10° | |
| Charged | 8600 | parts dicyandiamid |
| Recovered in bag filter | 950 | parts containing |
| | 187 | parts dicyandiamid |
| | 709 | parts melamine |
| | 54 | parts deamination products |
| Recovered in residue hopper | 7500 | parts containing |
| | 307 | parts dicyandiamid |
| | 3100 | parts melamine |
| | 4093 | parts deamination products |

Separation and recovery were made as in Example I.

While the above constitutes a preferred method of carrying out the separation of desired values from the furnace product using water as a solvent, yet where desired, the dicyandiamid may be separated from the remaining products by reason of its solubility in such liquids as methanol, ethanol, glycol, acetone and pyridine. The filter cake from such a separation consisting of melamine and its deamination products, may then be treated with hot water to dissolve out the melamine, recovery thereof being accomplished by crystallization.

As an alternative method for purifying the furnace product, this mixture may be heated under reduced pressure or at atmospheric pressure in a moving current of an inert gas to such a temperature that the melamine sublimes out and condenses on a cool surface.

Example III 100 parts of furnace residue produced as by the preferred method as containing approximately 37% melamine is heated under reduced pressure to 285° C. Sublimed melamine recovered as a result of this method analyzed 99% pure. Inasmuch as the vessel was heated above the conversion temperature of dicyandiamid, appreciable quantities of this material in the residue were converted to melamine which also sublimed, leaving the deamination products in the vessel. Obviously, this purification method may be combined with the conversion steps as above described in the preferred form of the invention.

It will be thus observed that we have proposed a method by which melamine and/or its deamination products may be advantageously obtained with a simple process for separating these products for recovery. Inasmuch as both the melamine and the deamination products have distinct fields of usefulness in and of themselves and are both valuable products, the production of one to the exclusion of the other is not at all necessary. Consequently, where melamine is the more desirable product, the deamination by-products such as melam, melem and mellon do not in any way represent a loss inasmuch as they may be disposed of in a variety of ways, particularly in the high state of purity here obtained.

While the invention has been shown and described with particular reference to specific embodiments, it is to be understood that it is not to be limited thereto but is to be construed broadly and restricted only by the scope of the claims.

We claim:

1. A process for the manufacture of a mixture of melamine and deamination products thereof which comprises heating molten dicyandiamide at substantially atmospheric pressure in the form of thin films in contact with extensive surfaces of substantial heat capacity.

2. A process for the manufacture of a mixture of melamine and deamination products thereof which comprises heating molten dicyandiamide in an open container in the form of thin films in contact with extensive surfaces of substantial heat capacity while continuously removing volatile conversion products by passing a stream of gas through said container.

3. A process for the manufacture of a mixture of melamine and deamination products thereof which comprises agitating dicyandiamide at temperatures of 225–350° C. and at substantially atmospheric pressure while in contact with extensive surfaces of substantial heat capacity, whereby the dicyandiamide is fused and coated on said surfaces and converted to the aminotriazine mixture in the form of thin films.

4. A process for the manufacture of a mixture of melamine and deamination products thereof which comprises agitating dicyandiamide at temperatures of 225–350° C. in an open container in contact with extensive surfaces of substantial heat capacity, whereby the dicyandiamide is fused and coated on said surfaces and converted to the aminotriazine mixture in the form of thin films, and continuously removing volatile conversion products by passing a stream of gas through said container.

5. A process for the manufacture of a mixture of melamine and deamination products thereof which comprises heating molten dicyandiamide at substantially atmospheric pressure in the form of thin films in contact with extensive surfaces of substantial heat capacity, passing a stream of hot gases over said films to remove volatile conversion products as they are formed, and subsequently separating an aminotriazine mixture rich in melamine from the gas stream.

6. A process for the manufacture of melamine which comprises heating molten dicyandiamide at substantially atmospheric pressure in the form of thin films in contact with extensive surfaces of substantial heat capacity, whereby a mixture of melamine and deamination products thereof is obtained, removing said mixture from said surfaces as fast as it is formed, dispersing said mixture in a solvent for melamine and unconverted dicyandiamide in which the deamination products are insoluble, separating the insolubles from the solution and fractionally crystallizing melamine therefrom.

7. A process according to claim 6 in which the solvent is water and the melamine is crystallized at temperatures above 70° C., after which the unconverted dicyandiamide is separated from the mother liquor at temperatures below 70° C.

8. A process for the manufacture of a mixture of melamine and deamination products thereof which comprises continuously agitating dicyandiamide in a ball mill having balls of substantial size, the total volume of said balls being in excess of the volume of the dicyandiamide, while heating said ball mill to temperatures above the melting point of dicyandiamide, whereby the dicyandiamide is fused and coated on said balls and is converted to aminotriazine in the form of thin films.

9. A process for the manufacture of a mixture of melamine and deamination products thereof which comprises continuously agitating dicyandiamide in a ball mill having balls of substantial size, the total volume of said balls being in excess of the volume of the dicyandiamide, while heating said ball mill to temperatures of 225–350° C. and passing a stream of gas therethrough to remove volatiles, whereby the dicyandiamide is fused and coated on said balls and is converted to aminotriazine in the form of thin films.

10. A process for the manufacture of a mixture of melamine and deamination products thereof which comprises continuously agitating dicyandiamide in a ball mill having balls of substantial size, the total volume of said balls being in excess of the volume of the dicyandiamide, heating said ball mill to temperatures above the melting point of dicyandiamide whereby the dicyandiamide is fused and coated on said balls and converted to aminotriazine in the form of thin films, passing a stream of hot gases over said films to remove volatile conversion products as they are formed, and subsequently separating an aminotriazine mixture rich in melamine from the gas stream.

LUDWIG J. CHRISTMANN.
GEORGE H. FOSTER.